US005341598A

United States Patent [19]

Reddy

[11] Patent Number: 5,341,598

[45] Date of Patent: Aug. 30, 1994

[54] POWER DOOR DRIVE AND DOOR SUPPORT HAVING MOTOR OPERATED LOCKS

[75] Inventor: Redreddy S. Reddy, Evanston, Ill.

[73] Assignee: Mark IV Transportation Products Corporation, Niles, Ill.

[21] Appl. No.: 880,794

[22] Filed: May 8, 1992

[51] Int. Cl.[5] ........................ E05F 11/34; F16H 55/17

[52] U.S. Cl. ........................................ 49/362; 74/458

[58] Field of Search ................. 49/362, 449; 74/89.15, 74/458; 384/454; 192/141

[56] References Cited

U.S. PATENT DOCUMENTS

| | | | |
|---|---|---|---|
| 1,300,782 | 4/1919 | Ryan . | |
| 3,308,674 | 3/1967 | Maroth . | |
| 3,467,453 | 9/1969 | Spencer et al. | 384/454 |
| 3,745,705 | 7/1973 | Reddy . | |
| 3,918,201 | 11/1975 | Graziano . | |
| 4,091,570 | 5/1978 | Favrel . | |
| 4,198,786 | 4/1980 | Monot . | |
| 4,454,931 | 6/1984 | Leiner et al. . | |
| 4,605,108 | 8/1986 | Monot | 49/362 X |
| 4,794,810 | 1/1989 | Parsons | 74/89.15 X |
| 5,077,938 | 1/1992 | Moreuil . | |

FOREIGN PATENT DOCUMENTS

| | | | |
|---|---|---|---|
| 2562134 | 10/1985 | France | 49/362 |

OTHER PUBLICATIONS

Applying Solid-State Position, Speed Monitoring, Photoelectric Level and Flow Sensors, Bulletin of Efector, Inc., 1091 Hawthorn Drive, Itasca, Ill. 60143 (7 pages).

*Primary Examiner*—Michael Milano

*Attorney, Agent, or Firm*—Francis J. Lidd

[57] ABSTRACT

Rotary locks used on transit vehicle doors when opened and closed by a rotating helical door drive member. In a preferred embodiment, a first lock utilizes a negative thread portion of the helical drive. A second lock utilizes a rotating lock pawl and stop. The drive and lock can be used to operate door systems with and without separate door hangers. Compensation for camber variations in car structure is provided through the use of spherical mounts or drive member journals.

18 Claims, 9 Drawing Sheets

POWER DOOR DRIVE AND DOOR SUPPORT HAVING MOTOR OPERATED LOCKS

BACKGROUND OF THE INVENTION

This invention relates generally to power drives for vehicular doors, and more specifically to drive systems employing rotary, helical drive members including primary and secondary mechanical door locks directly actuated by the helical drive.

Rotary helical drives for vehicular doors are typically disclosed in U.S. Pat. Nos. 5,077,938, and 3,745,705. The operators in these references employ rotary drives utilizing ball screw driven members or drive nuts and include various means of locking the associated vehicular doors.

Drive systems for vehicular doors utilized on mass transit vehicles must satisfy particular operating requirements specific to those vehicles. These requirements include positive, and in some cases, redundant mechanical lock systems, capable of insuring that doors remain closed and operable during car travel and any other car location other than predetermined passenger discharge areas. Additionally, it is required that doors can be manually opened through the use of an emergency release system which allows unlocking the door and manually forcing the doors from closed to an open position.

Door locking is particularly difficult with the rotary, helical drive, since the door is moved by a nut or moving member traveling on a threaded rod. With this system, any failure of the drive nut or motor actuated rotating threaded shaft can result in a free-wheeling door, or an ability to manually or back-drive the operator to a door open position.

Presently used drive systems typically include complicated and expensive auxiliary mechanisms to provide locking means external or ancillary to the drive system.

The invention disclosed herein features relatively simple lower cost primary and secondary locks directly driven by the rotating helical threaded drive member. Additionally, in the preferred embodiment, the invention disclosed herein is capable of supporting the driven door in addition to driving it from open to closed positions. While the rotary locks disclosed herein are shown in a configuration having direct door support, application of the lock to door systems utilizing separate door hangers is contemplated. Lock operation with or without a separate hanger is equivalent.

Accordingly, it is an object of this invention to provide a power door drive for mass transit vehicles utilizing a rotary, helical drive system having primary and secondary mechanical door locks directly operated by the helical drive.

It is an additional object of this invention to provide a rotary, helical door drive system for mass transit vehicles wherein the helical drive member carries the driven door.

It is a further object of this invention to provide a rotary, helical door drive system for mass transit vehicles wherein a primary lock is an integral part of the helical drive and driven nut.

It is a further object of this invention to provide a power door operator having a rotary, helical drive system wherein a secondary lock is integral in the helical drive and nut components.

It is a further object of this invention to provide an overdoor mounted rotary helical drive operator providing mounting bracket which will compensate for deflections and variations in the vehicle mounting structure.

BRIEF DESCRIPTION OF THE INVENTION

The drive system of the invention disclosed utilizes a helically threaded cylindrical drive rod and a cooperating driven nut for reciprocally moving across threaded portions of the helical drive. Attached to the driven nut is a door hanger including bearing means cooperating with the thread crests of the helical drive member so as to carry the driven door weight. Applicant's invention incorporates in part an improvement on the drive system disclosed in U.S. Pat. No. 3,308,674.

Although the rotary lock features of the invention are disclosed in an embodiment where the door weight is carried on a helically threaded drive rod, use of the locks in alternate embodiments having separate door hangers is contemplated throughout.

An alternate embodiment of the invention includes a separate door hanger such as disclosed in U.S. Pat. No. 3,745,705, incorporated by reference herein.

A particular feature of the operator is the use of zero pitch and negative pitch portions of the helical thread means located at the end of said threaded portion. On entering the zero and negative pitch portions of the thread, the driven nut is essentially locked in a manner similar to that of over-center locks commonly utilized in mechanical linkages. An additional or secondary lock is provided by a rotating lock pawl on the end of the threaded or helical drive member, cooperating with a sector shaped latch on the driven nut. The combination is arranged such that in the negative pitch portion of the helical drive member, the lock pawl and sector latch or striker forming a redundant lock wherein any axial movement of the nut along the helical drive member is prevented by both. This combination provides both primary and secondary locks operable by the rotary drive system.

Auxiliary electrical control circuitry incorporates counts indicative of rotary motion of the helical drive member and detection of the secondary lock positions of the lock pawl and sector latch described above. The system provides indication of proper door locking and, in the alternative, indication of operator malfunction or failure.

BRIEF DESCRIPTION OF THE DRAWINGS

Other objects and advantages of the invention will become apparent upon reading the following detailed description and upon reference to the drawings in which.

Figure 4:
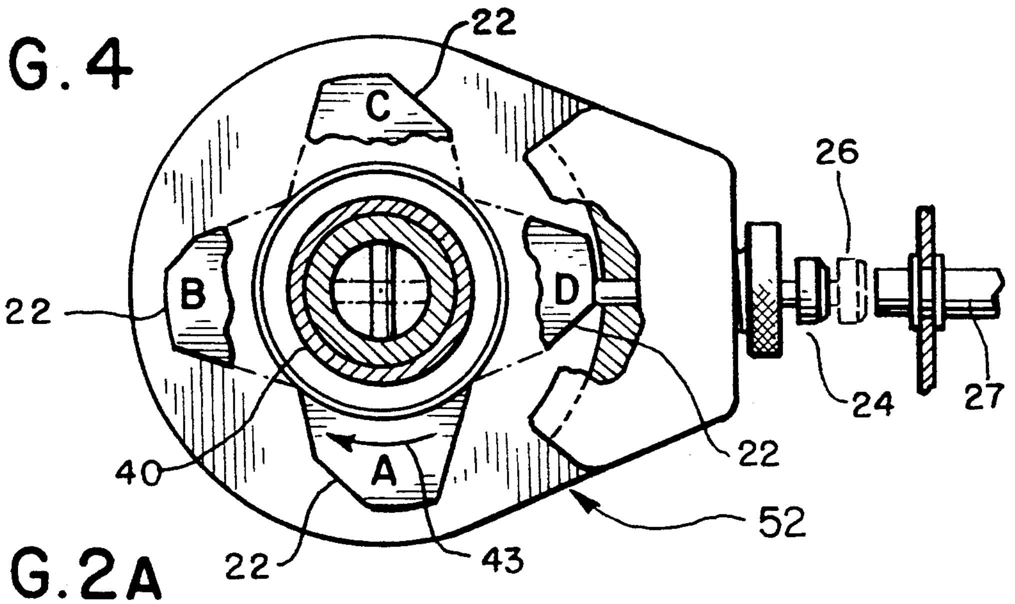

a: drive nut on drive screw in normal position just before door closing operation.

b: location and position of door lock pawl in "A" location of FIG. 4.

c: relative positions and locations of the lock pawl, lock pawl stop or striker and lock pawl actuated sensor.

d: sections of driven and assembly including shaft thrust bearing, shaft counter-gear, emergency actuator, and associated electromagnetic sensor.

Figure 3B:
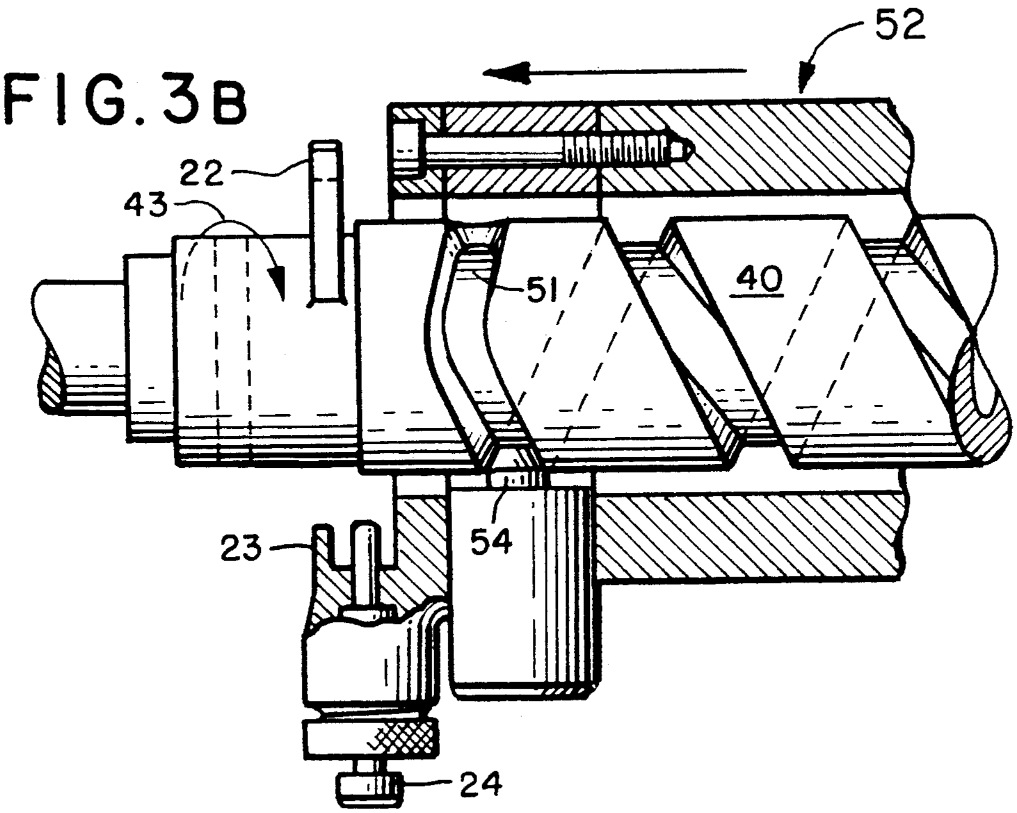
FIG. 3A is a partial section along the line 3*a*—3*a* of FIG. 2, particularly showing the following.
Figure 3A:
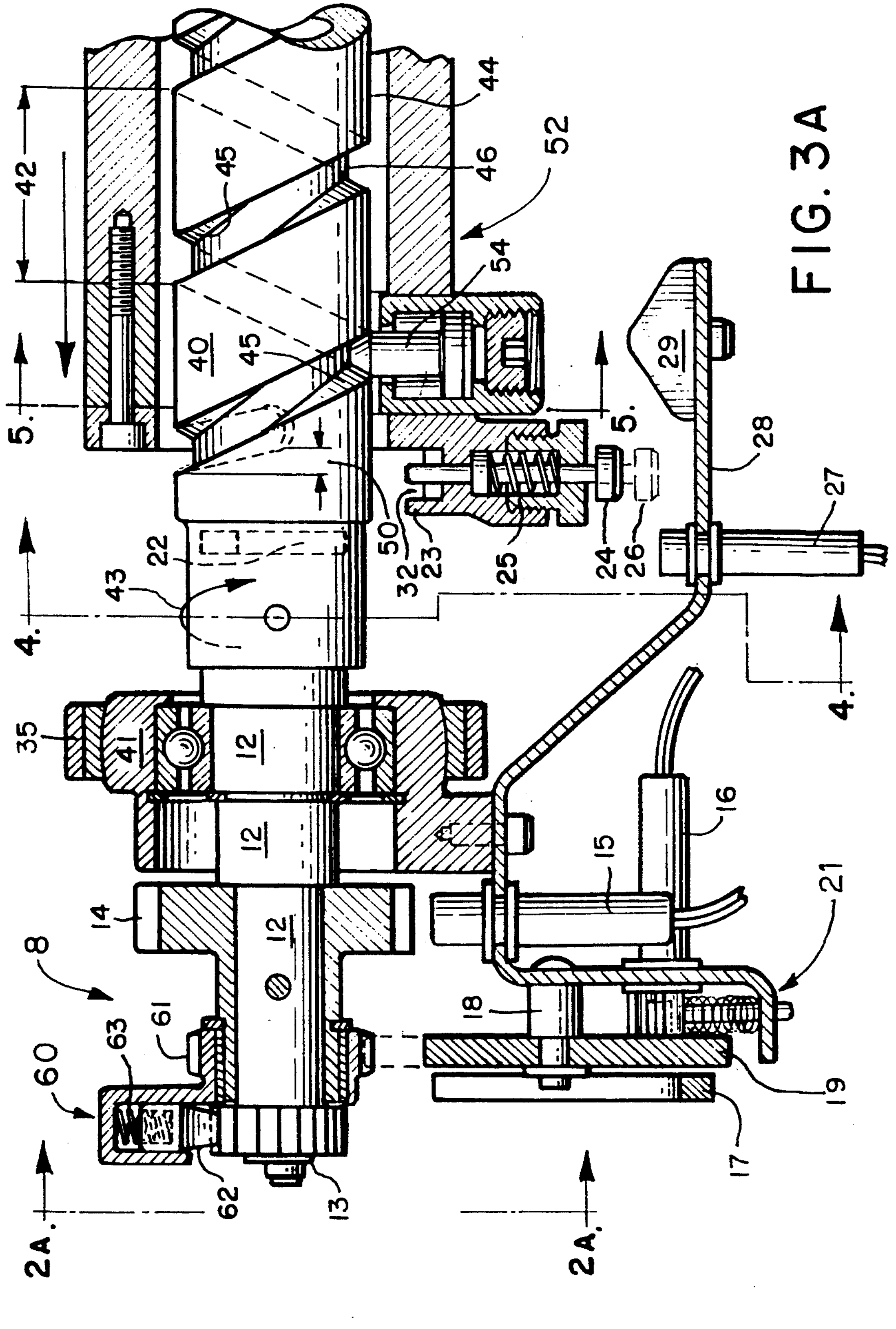

FIG. 3B is a portion of the section of FIG. 3A, however, limited to portions of the drive screw and door drive nut in location "B" of FIG. 4.

Figure 3C:
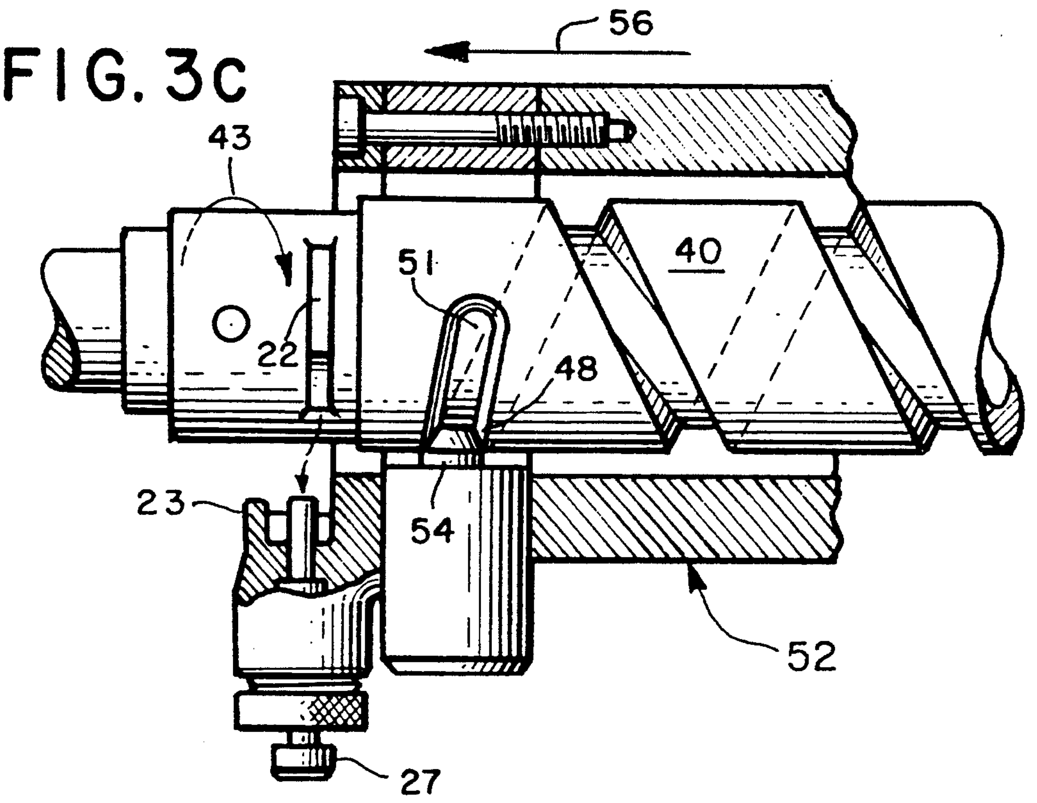

FIG. 3C is an additional section similar to FIG. 3B, however, showing the door drive screw, drive screw nut, and lock pawl in position "C" of FIG. 4.

Figure 3D:
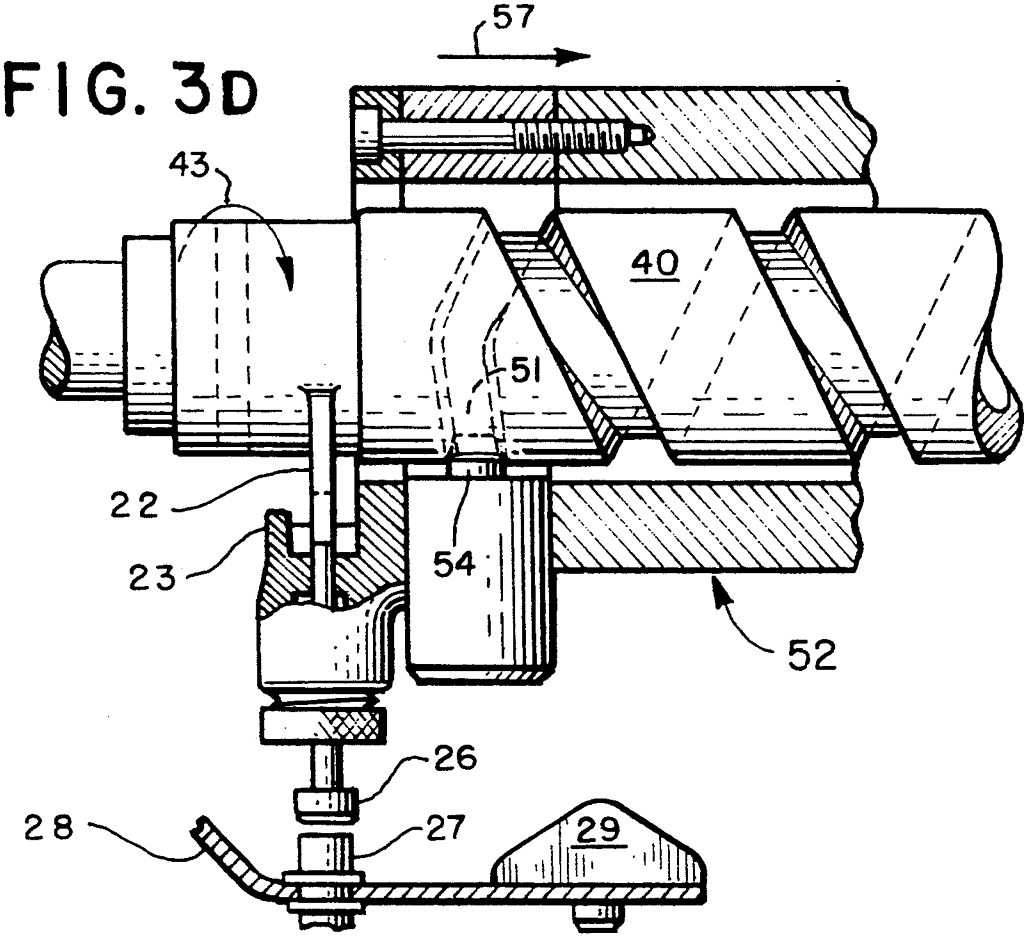

FIG. 3D is a section similar to FIG. 3C, however, showing the door drive screw lock pawl and lock pawl latch or stop in fully locked position in location "D" of FIG. 4.

FIG. 4 is a partial section of the driven end of the invention along line 4—4 of FIG. 3A, particularly showing sequential positions of the lock pawl in normal rotation, approaching lock, and the fully locked position of the lock pawl and lock pawl stop or striker.

Figures 2C, 5, 6:
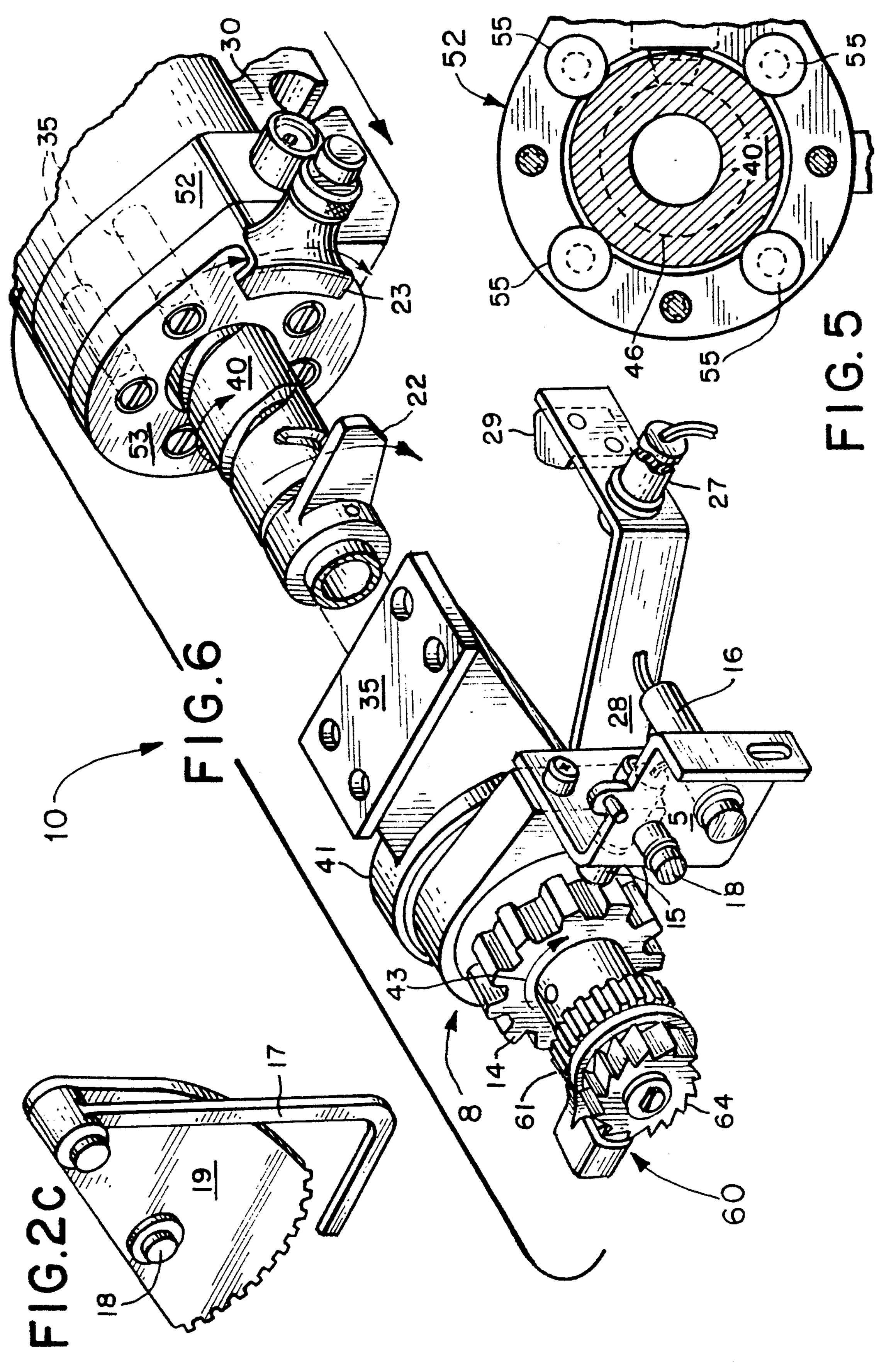
FIG. 2C is an additional fragmentary view of a portion of the emergency operating system of the invention, particularly showing the sector gear and its associated emergency handle.

FIG. 5 is a sectional view along the line 5—5 of FIG. 3A, particularly showing cam follower bearings as positioned in each end of the door drive nut.

FIG. 6 is an exploded partial view of the driven end of the door drive of the invention, particularly showing motion control and control elements of the invention.

Figure 7:
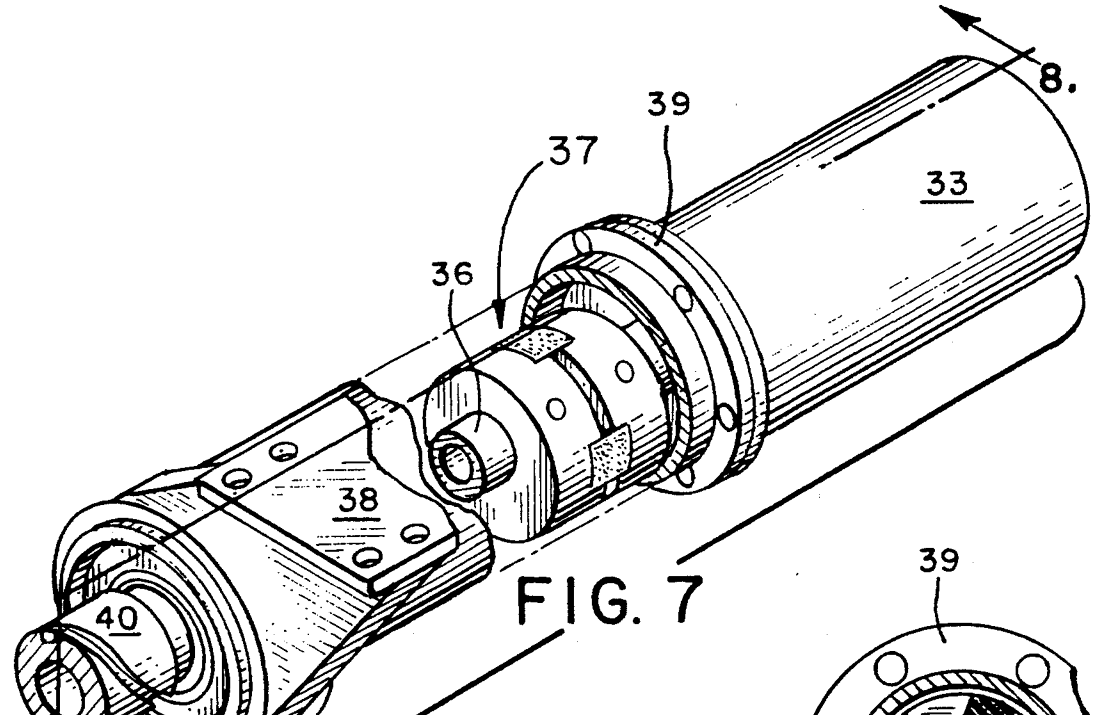

FIG. 7 is a partial additional exploded view of the drive end portion of the operator of the invention, particularly showing the drive motor, drive motor-screw drive shaft coupling and associated spherical bearing utilized in the car mounting bracket.

Figure 8:
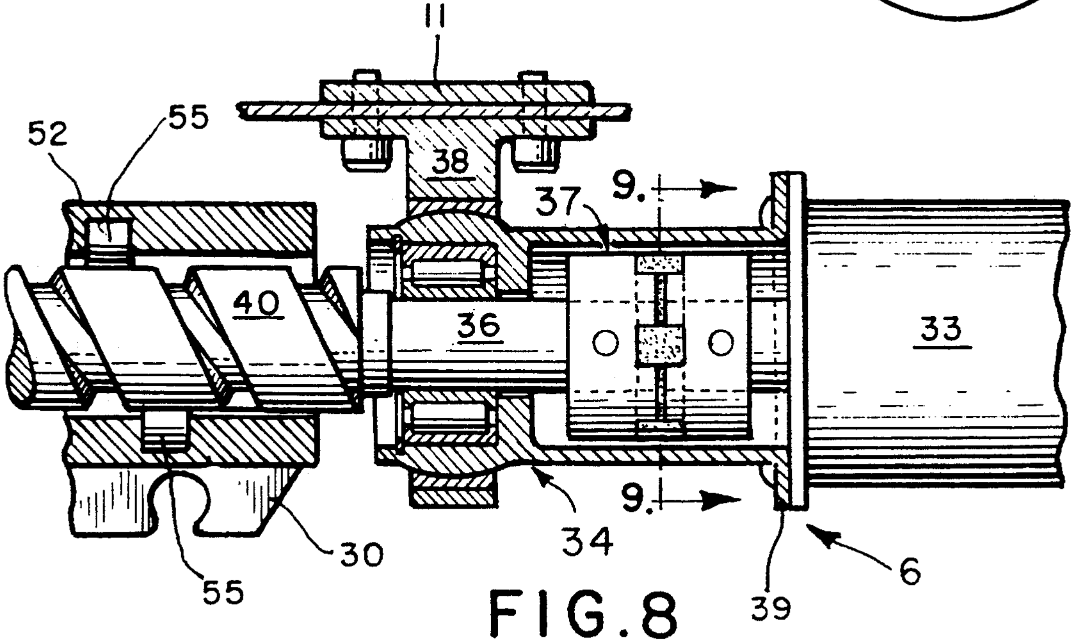

FIG. 8 is a section along the line 8—8 of FIG. 7, particularly showing the cylindrical or needle bearing in its spherical mount. Also shown is a portion of the screw drive opposite that of FIG. 5, and its door drive nut including the cam follower bearings internal of the nut.

Figure 9:
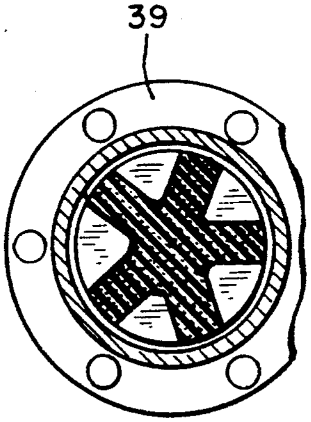

FIG. 9 is a section through line 9—9 of FIG. 8, particularly showing the resilient coupling and mating projections of the motor-drive screw shaft coupling.

Figure 10:
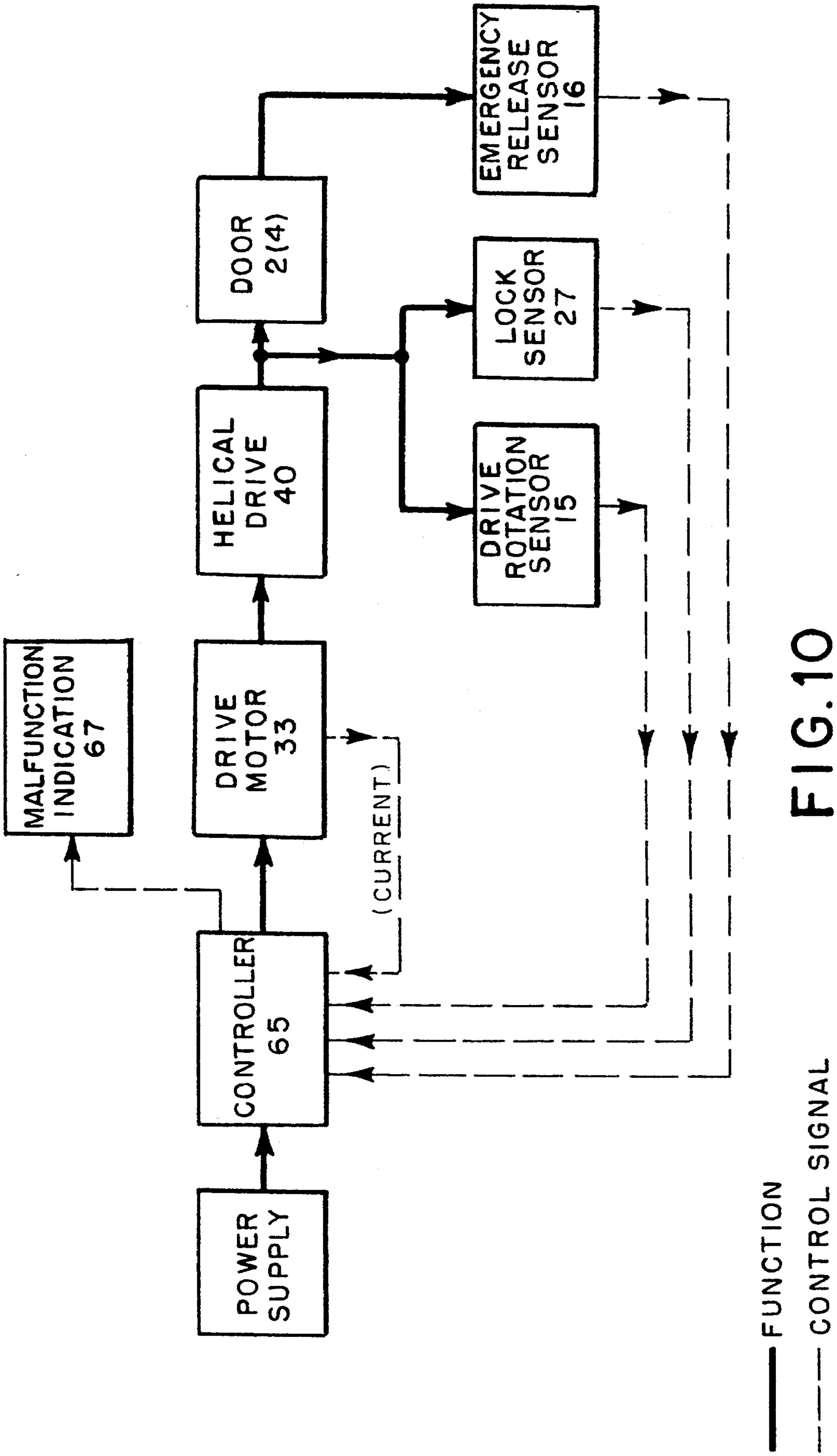

FIG. 10 is a "typical" control system employing the invention disclosed herein.

Figure 11:
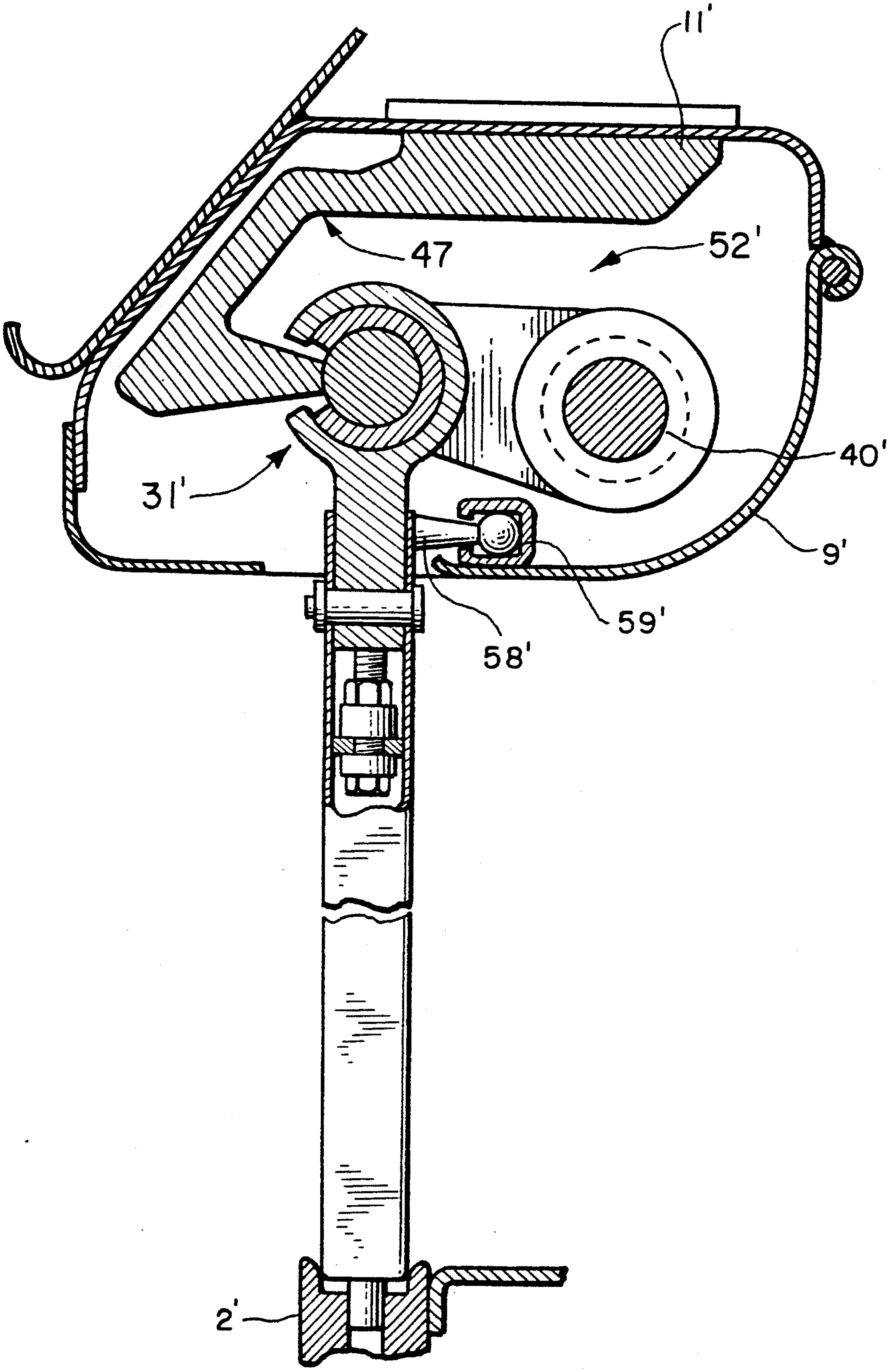

FIG. 11 shows a typical sectional view of an alternate embodiment of the invention utilizing a separate door hanger.

DETAILED DESCRIPTION OF OPERATION

While the invention will be described in connection with a preferred embodiment, it will be understood that it is not intended to limit the invention to that embodiment. On the contrary, it is intended to cover all alternatives, modifications and equivalents as may be included within the spirit and scope of the invention as described by the appended claims.

Figure 1:
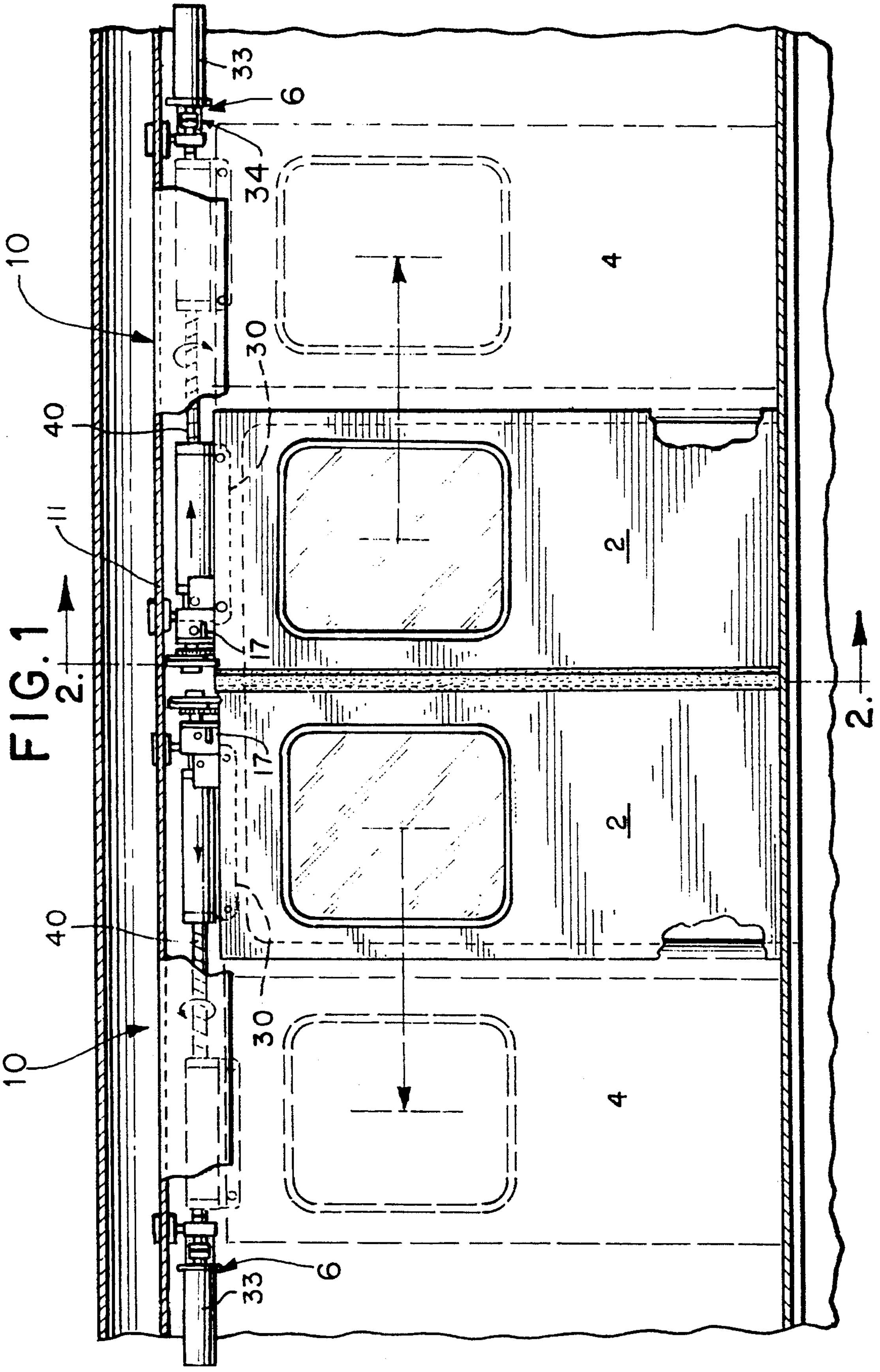
FIG. 1 is a partial section through a transit car utilizing the invention, particularly showing an inside view of vehicular doors, and the power door operator of the invention in place on the vehicular doors.

In reference to FIG. 1, there is shown biparting sliding doors 2 mounted in a vehicle side wall and driven by individual (dashed outline) overhead power door operator assemblies 10 from an open position to closed position (solid outline) and similarly from closed to open. The door drive includes a multiple pitch helical drive screw member 40 driven by an electric motor assembly 33 to provide door motion. Doors 2 are attached to helical drive 40 by a suitable door hanger assembly 31 (FIG. 2), attached to drive nut 52 and mounting tab 30. Although shown with individual operators per door, applicant submits that a single operator could operate both doors, from a single shaft power source, using threaded drive screws having opposite handed threads.

The drive motor end assembly 6 of drive screw 40 has a reduced diameter end 36 (FIG. 8) journaled in a spherical mount cylindrical roller self-aligning bearing 34 attached to the car structure 11 with bracket 38. Use of a cylindrical roller bearing is an important component of a self-alignment feature of the invention to be subsequently discussed in greater detail. Motor 33 is attached to the flange of the self-aligning bearing 34 by a flanged sleeve 39, and drives screw 40 through typical flexible coupling 37 of the Lovejoy® type. The self-aligning bearing 34 has the freedom of movement about the vertical axis and about the horizontal axis perpendicular to the axis of the drive screw.

A drive nut anti-rotation arm 58 extends from nut assembly 52. Arm 58 extends into a guide 59 attached to the operator housing 9 and extending along said housing for travel of the drive nut. Arm 58 and guide 59 maintain radial orientation of the drive screw nut during door movement.

The opposite or driven end 8 of the drive screw 40 is journaled in a spherical mount self-aligning thrust bearing 41 (Reference FIG. 3A). Both bearings 41 and 34 are suitably fastened to the car structure 11 (by supports 35 and 38, respectively). The drive screw member 40 carries a drive nut assembly 52.

With reference to FIG. 3A, also attached to the driven end assembly 8 of the drive screw 40 is an extended portion 12 having reduced diameters. Attached to the shaft portion 12, and fixed for rotary motion indicative of shaft rotation, and in sequential spacing from the rotary bearing journal, there are a toothed sprocket 14, a ratchet assembly 60, having an emergency release pinion gear 61, a ratchet pawl 62, a pawl spring 63, and a nut or stop fastener 13 mounted on the shaft end for maintaining location and spacing of the aforementioned gears. The ratchet assembly is free to rotate relative to toothed sprocket with a sleeve bearing in between.

Extending from the end face 53 of drive nut 52 and between the drive nut end 53 and the rotating lock pawl 22, is a lock pawl stop or striker 23. As best shown in FIG. 6, the rotating lock pawl 22 is essentially sector shaped as is the lock pawl stop 23, occupying a portion of the 360 degree radial periphery of either the drive screw shaft 12 and nut face 53, respectively.

The relative rotational and axial positions of lock pawl 22 and lock pawl stop 23 are an important portion of the invention disclosed herein in that as the rotating drive screw 40 moves drive nut 52 and its associated door hanger 30 to a point approaching the closed door location, positioning of the pawl stop 23 and rotating pawl 22 is such that in the final closed and locked position discussed above, any translation of the drive nut in the door open direction, due to either failure of the nut, or other malfunction in the system would bring pawl 22 and stop 23 into engagement, preventing opening of the door. This configuration, therefore, provides a positive lock operable only by rotation of the drive screw which maintains the door in its closed position. This lock provides additional redundancy in door locking, a highly desirable feature in operating transit car door equipment.

A further enhancement of the positive lock described above is provided by a spring loaded plunger 24 passing through a portion of the pawl stop 23. The plunger is extended to position 26 (Reference FIG. 3A) by presence of the rotating pawl 22 within the sector limits of the lock pawl stop 23 as shown in FIG. 3D. Extension of the plunger 24, therefore, provides an indication of the presence of the rotating pawl through cooperation with electromagnetic pickup or presence sensor 27 carried by a bracket 28 attached to the bearing mount as shown.

Located on an extension of the bracket 28 is a cam 29. Since, due to the one-to-one relationship between nut 52 location and rotation of drive shaft 40, it is possible to anticipate door location as a function of the shaft rotation. Rotation is determined by shaft angular position sprocket 14 through counting of electrical pulses due to the electromagnetic reluctance changes introduced in the drive screw rotation pickup or sensor 15 by the sprocket teeth peripheral to the shaft driven sprocket 14.

Since the plunger 24 is carried by the drive nut 52 to which the door is attached, it is mandatory that the nut 52 and, in turn, the door panel, reaches fully door closed position before the plunger 24 can interact with the pawl 22 which is secured to the drive screw and eventually actuated by the proximity sensor 27 to indicate the door closed and locked signal. Without meeting the above condition in entirety, the door closed and locked signal cannot be generated.

In the event that a malfunction in the drive system causes the drive nut 52 and the associated door carried by hanger 30 not to move to a closed position, and lock pawl 22 not actuate the plunger 24, a door actuator failure would be indicated through comparison of rotational counts from shaft rotational pickup 15 with electronic means of a conventional type (Reference FIG. 10), a malfunction would be detected.

However, if simultaneous failure of the compression spring 25 of the plunger 24, resulted in plunger 24 occupying an extended position without the presence of lock pawl 22, thereby indicating a closed and locked door, action of the cam 29 and plunger 24 on subsequent door excursions would result in movement of plunger 24 into an inoperative or retracted position relative to the plunger pickup or sensor 27, thereby avoiding false indication of a closed and locked door.

With reference to FIGS. 3A, 5 and 8, drive nut 52 incorporates a drive roller or pin 54 at one end. Drive pin 54 engages thread walls 45 in advancing drive nut 52 along drive shaft 40. Also drive nut (FIGS. 5 and 8) incorporates load bearing cam followers 55 at each end thereof.

Referring now to FIGS. 3A, 3B, 3C, 3D and 4, there is shown a portion of the threaded drive screw shaft 40. Thread crests 44 and valleys 46 of the running portion of shaft 40 have a first pitch 42 for linear travel per turn of the drive screw 40 when rotating in direction 43 for door travel from open to closed. The running thread pitch 42 extends from the threaded portion of the drive end 36 to a short transition portion having approximately zero lead. A negative or reverse lead or lock thread portion 50 of drive screw 40 then extends for approximately 90° rotation of the drive screw.

It should be noted that although advancing at a predetermined rate for the operating or running pitch 42, travel of the drive nut 52 in the negative lead portion 50 is, for a relatively limited amount of rotation of the drive screw 40 for approximately 90°, opposite in direction to motion of the drive nut when traveling in the running pitch portion of the thread 42. This complex motion is essential to operation of the operator disclosed herein in that for continuous unidirectional rotation of the drive screw 43, distinct and separate movements of the drive nut 52 and its associated door hanger 30 are obtained. These motions are:

- a predetermined travel distance 42 per revolution of shaft rotation;
- zero travel for a short transitional portion,
- and essentially reverse or negative travel shown by direction arrow 57 (Reference FIG. 3D) for an additionally predetermined number of shaft rotation degrees.

Again in reference to FIGS. 3A, 3B, 3C, and 4, there is shown operation of particularly important portions of the disclosed invention, in particular, a primary or negative thread pitch lock portion when roller pin 54 is in negative thread portion 51, and a secondary lock provided by the rotating lock pawl 22 and its cooperating lock pawl stop or striker 23, all operating in phased sequence through rotation of the unitary drive screw 40.

As best seen in FIG. 3A, where there is shown a partial cross section of the driven end assembly 8 of the operator of the invention, wherein the drive nut assembly 52 and its associated drive pin roller 54 are for the clockwise or closing rotation 43 shown advancing the door and nut toward the fully door closed position shown in FIG. 1 of the drive system.

In order to show relative locations of the operating portions of the operator disclosed, FIG. 1 is a partial sectional view looking outward from the inside of the car, whereas, the above mentioned FIGS. 3A, 3B, 3C, and 3D depict only the right hand operator of FIG. 1, as viewed from the driven end 8.

Turning again to FIGS. 3A and 4, the rotating lock pawl 22 is in the "A" position of FIG. 4 approximately 270° rotation from the fully locked position. In FIG. 3B, rotation of the screw drive 40 has proceeded 90° in direction 43 to the "B" position of FIG. 4. In FIG. 3C, rotation of screw drive 40 has advanced an additional 90° and is shown on FIG. 4 as location "C". It should be noted that in each of the FIGS. 3A, 3B and 3C the axial displacement of secondary lock stop 23 has advanced in the direction shown by motion arrows 56, i.e, approaching the fully locked position of FIG. 3D. Also advancing is the drive nut and its roller pin 54 from a normal thread pitch 42 in FIG. 3A until in FIG. 3C roller 54 has advanced to essentially a "0" pitch point 48 of the threaded drive 40. In FIG. 3D, rotation of the drive screw 40 has moved the drive roller pin 54 to the end of a negative pitch portion of the thread 51, thereby providing effective "over-center" locking of the drive screw 40 and nut 52, since force on the door in the opening direction cannot produce rotational torque in a rotation of the screw in the direction of door opening. The exertion of force on the door in the opening direction, in fact, will produce rotation of the drive screw in the closing direction due to the nature of the negative lead thread action. Although the lock or negative thread portion 51 in a preferred embodiment occupies 90° rotation of drive screw 40, other desired lengths and thread pitches could as well be utilized to achieve the self locking described above.

Along with the travel of roller pin 54 to the end of a 90° negative lead portion of drive thread 40, i.e., portion 51 and associated travel of nut 52, the secondary lock pawl 22 moves to occupy a slot 32 between the lock pawl stop or striker 23 and the drive nut face 53. This position insures that should the drive pin 54 fail, relative movement of the drive nut 52 along the drive thread 40 would be prevented by interference between the lock pawl 22 and the inner portion of the lock pawl stop or striker 23 (Reference FIGS. 3D and 6).

This combination provides redundant locking of the car doors in a simple, highly effective and inexpensive way. It should be noted that with the aforementioned redundant lock combination of the negative thread portion of the threaded drive screw, essentially an "overcenter" lock, and an associated positive mechanical lock, only rotation of the threaded drive member 40 can effectively unlock the door. Therefore, applicant has provided in a single rotary motion both primary and secondary locking means, a highly important feature in transit vehicle power doors.

An additional and novel feature of the invention disclosed herein provides improved operation and installation through self-adjusting mounting devices. A known difficulty in operating door equipment on modern transit vehicles arises through variation in car structure dimensions due to normal tolerance variations in manufacture, and, in particular, car structure variations at the door operator mounting due to variations in structure camber caused by passenger loading and unloading in normal day-to-day operation.

The invention disclosed herein overcomes many of these difficulties through the use of a combination of spherical and roller bearing assembly 34 in combination with a resilient motor coupling 37 in the drive end assembly 6 (Reference FIG. 9). Similarly, at the driven end assembly 8, drive screw 40 is journaled at its reduced diameter 12 by a spherically mounted thrust ball bearing 41.

Figure 2:
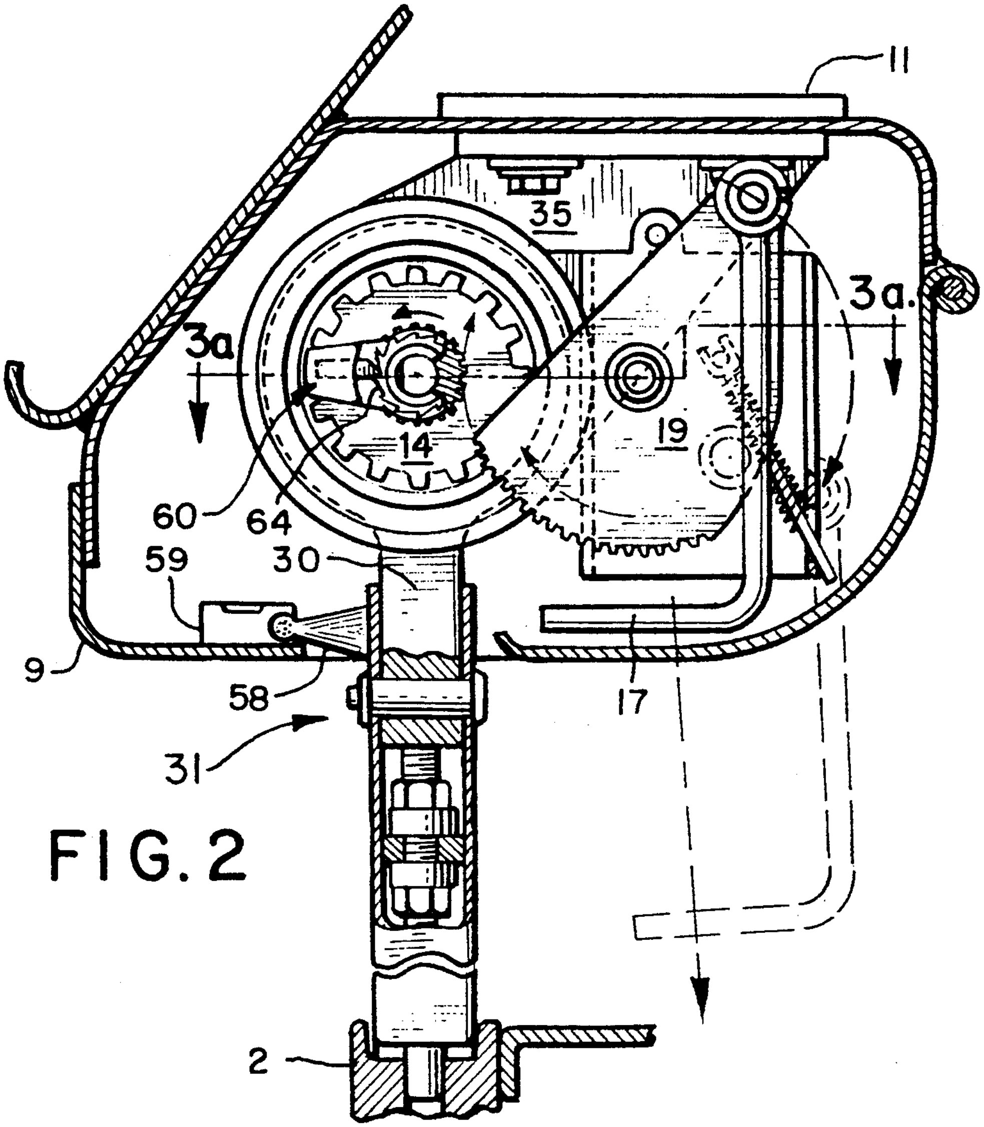
FIG. 2 is a partial section along the line 2—2 of FIG. 1, particularly showing location of an emergency door opening actuator in a normal or unactuated position.

Applicant has discovered that utilization of spherical, self-aligning bearings in combination with thrust and roller bearings, respectively, at either end of helical drive member 40 provides improved installation and performance of the operator, i.e. when mounting the operator assembly 10 using brackets 35 and 38 to the car structure 11 (Reference FIGS. 2 and 9).

In particular, the use of spherically mounted bearings allows for deflection or change in camber of the car structure 11 between mounts 35 and 38 without imposing stresses on the drive member 40.

Figure 2B:
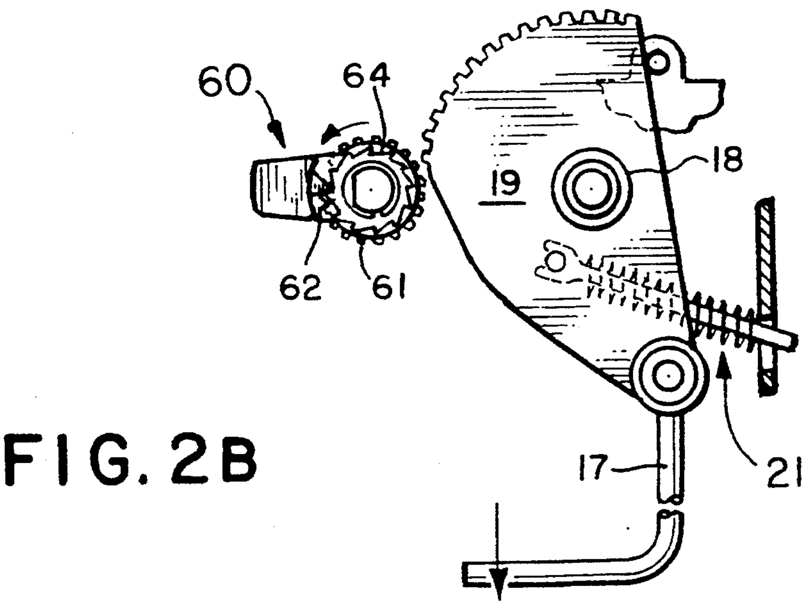
FIG. 2B is a fragmentary view of a portion of FIG. 2, particularly showing the emergency door opening structure of the invention including a sector gear, cooperating pinion, and ratchet assembly in an emergency or actuated position.
Figure 2A:
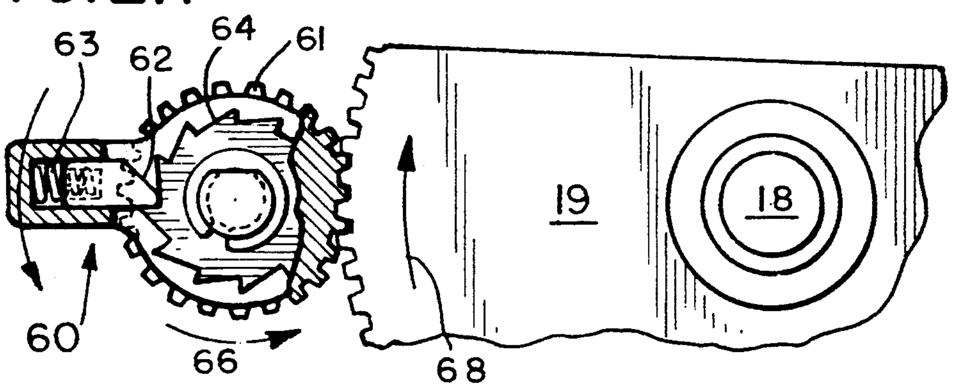
FIG. 2A is a fragmentary view of a portion of FIG. 2, particularly showing the emergency sector gear and rotating shaft cooperating with the ratchet assembly, shown in operation or door unlock position.

With reference to FIGS. 2, 2A and 2B, cooperating with emergency release pinion 61 and ratchet assembly 60 is an emergency release sector gear 19 (reference FIG. 2B). Operatively attached to sector gear 19 is emergency release handle 17. In an emergency release position (Reference FIG. 2B), sector gear 19 is maintained in the emergency position by toggle assembly 21. Toggle assembly 21 maintains the sector gear in either its inoperative or normal position (as shown in FIG. 2), or in an extended or emergency position to be subsequently discussed.

As indicated earlier, the positive lock portion 50 of the drive screw shaft 40 represents nominally 90° degrees rotation of the shaft, therefore, in order to manually unlock the door in the absence of drive screw power rotation, it is only necessary to rotate the drive screw shaft for approximately 90° degrees in the opening direction. This is accomplished through manually moving handle 17, in a downward direction, thereby rotating sector gear 19 around its pivot 18 mounted on a bracket 5 in the direction shown, thereby engaging sector gear 19 and the emergency release pinion 61. Movement of the handle 17 to its emergency position rotates the drive screw shaft 40 out of the lock portions 50 and 51 of the drive screw thread (reference FIGS. 2 and 2B). At this point, the running lead 42 of drive screw shaft 40 is such that manual force on the door 2 will continue reverse rotation of the shaft 40, allowing the door to be manually opened. Since the toggle assembly 20 maintains the gear 19 in an upward position, electromagnetic position sensor 16 mounted on bracket 5, detects absence of the gear 19 and, through operation of an associated control system (Reference FIG. 10), prevents power operation of the door when the sector gear is in the upper or emergency position (reference FIG. 2B).

Ratchet assembly 60 allows resetting of the emergency handle 17. Pinion 61 and spring loaded ratchet pawl 62 are a part of ratchet assembly 60. Pinion gear 61 is an integral part of the ratchet assembly 60. Ratchet assembly 60 is mounted on the sprocket 14 with a suitable bearing and is rotatable around sprocket 14. Sprocket 14 is secured to the drive screw reduced portion 12. The ratchet gear 64 is an integral part of the sprocket 14. Torque from the sector gear 19 is transmitted to the drive screw 40 in opening direction 66 through the pinion gear 61 and the ratchet assembly 60 in conjunction with spring loaded ratchet pawl 62 and ratchet gear 64. However, movement in an opposite direction is free, allowing upward motion of handle 17 to reset.

An alternate embodiment of the invention is shown in FIG. 11. With this construction, a separate hanger assembly 47 cooperates with door hanger assembly 31' to support the door 2.

Operation of this embodiment is identical to that earlier described in that power rotation of the helical drive member 40' results in travel of the drive nut assembly 52' therealong.

In reference to FIG. 10, a typical but not limiting control system utilizing the invention disclosed herein is shown. A controller 65 which may be of a type utilizing a microprocessor, programmable solid state logic, or relay logic, controls current to the drive motor 33. In turn, the drive motor 33 supplies torque to the helical drive member 40 or, as better shown by the drive end assembly 8, operate the doors in movement from open to closed.

The microprocessor accepts inputs from the emergency actuator sensor 16, the door closed and lock sensor 27 operated by the rotating lock cam, and signals from the drive rotation counter assembly, i.e., sprocket 14 and sensor 15. Additional input representative of the drive motor current is also provided at the input of the controller 65 (Reference FIG. 10).

As discussed above, normal operation, of the drive system in moving doors from open to closed, results in a predetermined number of rotations of the drive member 40 through counts signaled by the counter sensor 15 for predetermined door travel. Since the rotary helical drive advances a fixed amount per revolution, counts generated by sensor 15 are compared with a stored proper amount representative of normal door operation in the controller 65.

Similarly, signals from the lock sensor 27 are entered into the controller 65 when lock pawl 22 enters the lock pawl striker or stop 23, extending plunger 26, thus providing an indication through sensor 27.

In operation, on initiating a door closed operation, a proper number of counts from sensor 15 and indication of closed and lock from sensor 27 indicate normal operation and do not result in an indication of malfunction on indicator 67. Should either the helical drive counts or the lock indicator deviate from their predetermined pattern, indications of door operator malfunction are suitably shown in the malfunction indicator 67.

A further action of the controller 65 involves the presence or lack of presence of the emergency lever 17 as indicated by sensor 16. In operation, should the emergency lever be actuated by pulling downward (Reference FIG. 2) sector gear 19 would move into its actuated position (Reference FIG. 2B), and the resulting uncovering of sensor 16 would provide a signal to controller 65 for proper response to the perceived emergency situation.

It should be noted that many other features in other combinations of the disclosed inventions could be incorporated in other control arrangements as needed for any particular application. As these alternate systems are not a part of the invention disclosed here, the system of FIG. 10 is included only in order to complete applicant's disclosure.

Thus it is apparent that there has been provided in accordance with the invention of a power door drive and door support using motor operated locks that fully satisfy the objects, aims and advantages set forth above. While the operator disclosed has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed as new and desired to be secured by Letters Patent of the United States is:

1. A rotary lock for an electric door drive used to open and close a door in a transit vehicle comprising:

a rotary helical drive member;

means electrically rotating said drive member;

continuous thread means on said drive member, said threads having positive and negative pitch segments, said segments corresponding to running and lock portions of said drive member, respectively;

nut means running on said thread means, said nut means carrying said door for motion therealong when said drive member is rotated, said motion moving said door along the running thread portion from a door open position to said lock thread portion for a door closed position;

whereby nut travel into said lock thread portion prevents door movement without shaft rotation.

2. The rotary lock of claim 1 further comprising:

car structure means overhead said door, for mounting said door drive, said structure having load induced camber variations;

first and second ends on said drive member;

first and second means spherically journaling said first and second drive member ends, respectively, for rotation therein, said journal means mounted on and disposed along said structure;

cylindrical roller bearing means in one of said journal means;

thrust roller bearing means in the other of said journal means;

wherein load induced variations in car structure camber are compensated by said journaling means.

3. A rotary lock for an electric door drive used to open and close transit vehicle doors comprising:

a door mounted for opening and closing an opening in a transit vehicle side wall;

a rotary helical drive member having first and second ends, said ends journaled overhead said door opening for rotary motion;

means, on said second end, electrically rotating said drive member;

thread means on said drive member;

nut means running on said thread means, said nut means having a face adjoining said drive member first end, an outer edge on said face, said nut carrying said door for motion therealong when said drive member is rotated, said motion moving said door from open to closed;

a rotating lock pawl on said drive member first end, said lock pawl extending perpendicular to said drive member and occupying a limited sector of said lock pawl rotating periphery;

striker means on said nut edge and extending outward and downward therefrom, said striker occupying a limited sector of said nut periphery, a lock space defined by said striker and nut face;

means disposing said rotating lock pawl within said lock space for a door closed position;

wherein nut travel from door open to door closed positions moves said lock pawl into said lock space, thereby preventing door motion without drive member rotation.

4. A power door operator of the type utilizing a rotary helical drive and cooperating drive nut for moving a door from open to closed positions over an opening in a vehicular side wall comprising:

a rotary helical drive member having first and second ends;

means on said second end for electrically rotating said member;

continuous thread means on said drive member, said thread means having helical segments of positive and negative pitch threads, said segments corresponding to running and lock positions on said drive member, respectively;

nut means running on said thread means, said nut means carrying said door for motion therealong on rotation of said drive member, said nut motion moving said door along the running thread portion from a door open position to said lock thread portion for a door closed position;

a face, having an outer edge, on said nut, said face adjoining said first drive member end;

a rotating lock pawl on said helical drive member first end, said lock pawl extending perpendicular to said drive member and occupying a limited sector of said lock pawl rotating periphery;

striker means on said nut means, said striker extending inward from said nut outer edge and spaced therefrom, said striker and nut face defining a lock space adjacent said nut face;

means disposing said lock pawl internal of said lock space for a door closed position;

wherein said door closed position of said nut and said lock pawl prevent door movement along said drive member without drive member rotation.

5. A rotary lock for an electric door drive used to open and close transit vehicle doors comprising:

a door, mounted for movement over and away from an opening in a transit vehicle side wall;

a rotary helical drive member having first and second ends journaled for rotary motion;

means electrically rotating said drive member second end;

thread means on said drive member;

nut means running on said thread means, said nut means carrying said door for motion therealong when said drive member is rotated, said motion moving said door from open to closed and from closed to open positions;

a face having an outer edge on said nut, said face adjoining said drive member first end;

a lock pawl on said drive member first end, said lock pawl extending perpendicular to said drive member and occupying a limited sector of said lock pawl rotating periphery;

stop means on said nut face outer edge adjacent said lock pawl and spaced therefrom, said stop extending inwardly from said edge and spaced from said face, thereby defining a lock space, said stop occupying a limited sector of said nut face and edge;

means disposing said lock pawl within said lock space for a door closed position; and plunger means in said stop means, said plunger extended by said lock pawl when in said lock space, and retracted when said lock pawl is out of said lock space;

means sensing said extended plunger position and generating a signal therefor;

indicator means responsive to said signal;

wherein movement of said door to a door closed and locked position is verified.

6. A power door operator of the type utilizing a rotary helical drive and cooperating drive nut for moving a door from open to closed positions over an opening in a vehicular side wall comprising:

a rotary helical drive member having first and second ends;

means on said second end, electrically rotating said member;

continuous thread means on said drive member, said threads having segments of positive and negative pitch threads, said segments corresponding to running and lock positions on said drive member, respectively;

nut means running on said thread means, said nut means carrying said door for motion therealong on rotation of said drive member, said nut motion moving said door along the running thread portion from a door open position to said lock thread portion for a door closed position;

a face, having an outer edge, on said nut, said face adjoining said first drive member end;

a rotating lock pawl on said helical drive member first end, said lock pawl extending perpendicular to said drive member and occupying a limited sector of said lock pawl rotating periphery;

striker means on said nut means, said striker extending inward from said nut outer edge and spaced therefrom, said striker and nut face defining a lock space adjacent said nut face;

means disposing said look pawl internal of said lock space for a door closed position;

plunger means in said striker means, said plunger extended by said lock pawl when in said lock space, and retracted when said lock pawl is out of said lock space;

means sensing said extended plunger position and generating a signal therefor;

indicator means responsive to said signal;

wherein said door closed position of said nut in said lock pawl is indicated and door movement along said drive member without drive member rotation is prevented.

7. A power door operator of the type utilizing a rotary helical drive and cooperating drive nut for moving a door from open to closed positions over an opening in a vehicular side wall comprising:

a rotary helical drive member;

means electrically rotating said drive member;

continuous thread means on said drive member, said threads having segments of positive and negative pitch threads, said segments corresponding to running and lock positions on said drive member, respectively;

nut means running on said thread means, said nut means carrying said door for motion therealong on rotation of said drive member, said nut motion moving said door along said running thread portion from a door open position to said lock thread portion for a door closed position;

whereby nut travel into said lock thread portion prevents door movement without shaft rotation.

8. The operator of claim 7 further comprising:

car structure means overhead said door, for mounting said operator, said structure having car loading induced camber variations;

first and second ends on said rotary helical drive member;

first and second means spherically journaling said first and second drive member ends, respectively, for rotation therein, said journal means mounted on and disposed along said structure;

cylindrical roller bearing means in one of said journal means;

thrust roller bearing means in the other of said journal means;

wherein load induced variations in car structure camber are compensated by said journaling means.

9. An integral power door operator mounted overhead of a transit vehicle door for opening and closing an opening in said vehicle comprising:

car structure means overhead of said opening, having an initial essentially linear configuration overhead of said opening and angular deviation from said linear configuration due to camber variations incurred in car loading, for mounting said operator;

a rotary helical drive member having ends and a central portion therebetween;

means coupled to said helical member for rotation thereof;

continuous thread means on said drive member central portion;

nut means running on said thread means, said nut means driving said door for motion therealong on rotation of said drive member;

means spherically journaling said drive member ends, for rotation therein;

cylindrical roller bearing means in one of said journal means;

thrust roller bearing means in the other of said journal means;

means mounting said journal means on said car structure said mounting means rigidly attached to said overhead car structure and spaced therealong, thereby following said angular deviations of said overhead structure;

wherein load induced angular deviations in said mounting means are compensated by said journaling means.

10. A rotary lock for an electric door drive used to open and close a door in a transit vehicle comprising:

means supporting said door for motion from open to closed;

a rotary helical drive member;

means electrically rotating said drive member;

continuous thread means on said drive member, said threads having positive and negative pitch segments, said segments corresponding to running and lock portions of said drive member, respectively;

nut means running on said thread means, said nut means attached to said support means for motion therealong, when said drive member is rotated, said motion moving said door along the running thread portion from a door open position to said lock thread portion for a door closed position;

whereby nut travel into said lock thread portion prevents door movement without shaft rotation.

11. The rotary lock of claim 10 further comprising:

car structure means overhead said door, for mounting said door drive, said structure having load induced camber variations;

first and second ends on said drive member;

first and second means spherically journaling said first and second drive member ends, respectively, for rotation therein, said journal means mounted on and disposed along said structure;

cylindrical roller bearing means in said first journal means;

thrust roller bearing means in said second journal means;

wherein load induced variations in car structure camber are compensated by said journaling means.

12. A power door operator of the type utilizing a rotary helical drive member and cooperating drive nut for moving a door from open to closed positions over an opening in a vehicular side wall comprising:

means mounting said door for motion from open to closed positions over said opening;

a rotary helical drive member having first and second ends;

means electrically rotating said member second end;

continuous thread means on said drive member, said threads having segments of positive and negative pitch threads, said segments corresponding to running and lock positions on said drive member, respectively;

nut means running on said thread means, said nut means attached to said mounting means for motion therealong on rotation of said drive member, said nut motion moving said door along the running thread portion from a door open position to said lock thread portion for a door closed position;

a face, having an outer edge, on said nut, said face adjoining said first drive member end;

a rotating lock pawl on said helical drive member first end, said lock pawl extending perpendicular to said drive member and occupying a limited sector of said lock pawl rotating periphery;

striker means on said nut means, said striker extending inward from said nut outer edge and spaced therefrom, said striker and nut face defining a lock space adjacent said nut face;

means disposing said lock pawl internal of said lock space for a door closed position;

wherein said door closed position of said nut and said lock pawl prevent door movement along said drive member without drive member rotation.

13. A rotary lock for an electric door drive used to open and close transit vehicle doors comprising:

means mounting a door for movement over and away from an opening in a transit vehicle side wall;

a rotary helical drive member having first and second ends journaled for rotary motion therearound;

means electrically rotating said drive member second end;

thread means on said drive member;

nut means running on said thread means, said nut means attached to said mounting means for motion therealong when said drive member is rotated, said nut motion moving said door from open to closed and from closed to open positions;

a face having an outer edge on said nut, said face adjoining said drive member first end;

a lock pawl on said drive member first end, said lock pawl extending perpendicular to said drive member and occupying a limited sector of said lock pawl rotating periphery;

stop means on said nut face outer edge adjacent said lock pawl and spaced therefrom, said stop extending inwardly from said edge and spaced from said face, thereby defining a lock space, said stop occupying a limited sector of said nut face and edge;

means disposing said lock pawl within said lock space for a door closed position; and plunger means in said stop means, said plunger extended by said lock pawl when in said lock space, and retracted when said lock pawl is out of said lock space;

means sensing said extended plunger position and generating a signal therefor;

indicator means responsive to said signal;

wherein movement of said door to a door closed and locked position is verified.

14. An integral power door operator mounted overhead of a transit vehicle door for opening and closing an opening in said vehicle comprising:

car structure means linearly configured above and across said opening, said structure having angular deviations from said linear configuration due to camber variations incurred in car loading, for mounting said operator;

a rotary helical drive member having first and second ends;

means coupled to said first helical member ends for rotating said helical drive;

continuous thread means on said drive member;

nut means running on said thread means, said nut means driving said door for motion therealong on rotation of said drive member;

first and second means journaling said first and second drive member ends, respectively, for rotation therein;

means spherically mounting said journal means to said car structure, said mounting means rigidly attached to said car structure and spaced therealong, said mounting means thereby following said angular deviations of said structure;

bearing means in said journal means;

wherein load induced angular deviations in car structure are compensated by said journaling means.

15. A rotary lock for an electric door drive used to open and close transit vehicle doors comprising:

a door, mounted for movement over and away from an opening in a transit vehicle side wall;

a rotary helical drive member having first and second ends journaled for rotary motion;

means electrically rotating said drive member second end;

thread means on said drive member;

nut means running on said thread means, said nut means carrying said door for motion therealong when said drive member is rotated, said motion moving said door from open to closed and from closed to open positions;

a face having an outer edge on said nut, said face adjoining said drive member first end;

lock means on said drive member first end, said lock means extending perpendicular to said drive member and occupying a limited radial sector of said lock means rotating periphery;

stop means on said nut face outer edge adjacent said lock means and spaced therefrom, said stop extending inwardly from said edge and spaced from said face, thereby defining a lock space, said stop means occupying a limited radial sector of said nut face and edge;

means positioning said lock means within said lock space for a door closed position; and means sensing said lock means position and generating a signal therefor;

indicator means responsive to said signal;

wherein movement of said door to a door closed and locked position is verified.

16. A power door operator of the type utilizing a rotary helical drive and cooperating drive nut for moving a door from open to closed positions over an opening in a vehicular side wall comprising:

a rotary helical drive member having first and second ends;

means on said second end, electrically rotating said member;

continuous thread means on said drive member, said threads having segments of positive and negative pitch threads, said segments corresponding to running and lock positions on said drive member, respectively;

nut means running on said thread means, said nut means carrying said door for motion therealong on rotation of said drive member, said nut motion moving said door along the running thread portion from a door open position to said lock thread portion for a door closed position;

a face, having an outer edge, on said nut, said face adjoining said first drive member end;

rotating lock means on said helical drive member first end, said lock means extending perpendicular to said drive member and occupying a limited sector of said drive member rotating periphery;

striker means on said nut means, said striker extending inward from said nut outer edge and spaced therefrom, said striker and nut face defining a lock space adjacent said nut face;

means positioning said lock means internal of said lock space for a door closed position;

means sensing said lock means position and generating a signal therefor;

indicator means responsive to said lock signal;

wherein said door closed position of said nut in said lock means is indicated and door movement along said drive member without drive member rotation is prevented.

17. A power door operator of the type utilizing a rotary helical drive member and cooperating drive nut for moving a door from open to closed positions over an opening in a vehicular side wall comprising:

means mounting said door for motion from open to closed positions over said opening;

a rotary helical drive member having first and second ends;

means electrically rotating said member first end;

continuous thread means on said drive member, said threads having segments of positive and negative pitch threads, said segments corresponding to running and lock positions on said drive member, respectively;

nut means running on said thread means, said nut means attached to said mounting means for motion therealong on rotation of said drive member, said nut motion moving said door along the running thread portion from a door open position to said lock thread portion for a door closed position;

a face, having an outer edge, on said nut, said face adjoining said first drive member end;

rotating lock means on said helical drive member adjacent said first end, said lock means extending perpendicular to said drive member and occupying a limited sector of said drive member rotating periphery;

striker means on said nut means, said striker extending from said nut outer edge and spaced therefrom, said striker and nut face defining a lock space adjacent said nut face;

means disposing said lock means internal of said lock space for a door closed position;

wherein said door closed position of said nut and said lock means prevent door movement along said drive member without drive member rotation.

18. A rotary lock for an electric door drive used to open and close transit vehicle doors comprising:

means mounting a door for movement over and away from an opening in a transit vehicle side wall;

a rotary helical drive member having first and second ends journaled for rotary motion therearound;

means electrically rotating said drive member first end;

thread means on said drive member;

nut means running on said thread means, said nut means attached to said mounting means for motion therealong when said drive member is rotated, said nut motion moving said door from open to closed and from closed to open positions;

a face having an outer edge on said nut, said face adjoining said drive member first end;

lock means on said drive member adjacent said first end, said lock means extending perpendicular to said drive member and occupying a limited sector of said drive member rotating periphery;

stop means on said nut face outer edge adjacent said lock means and spaced therefrom, said stop extending inwardly from said edge and spaced from said face, thereby defining a lock space, said stop occupying a limited sector of said nut face and edge;

means disposing said lock means within said lock space for a door closed position; and means sensing said extended lock means position and generating a signal therefor;

indicator means responsive to said signal;

wherein movement of said door to a door closed and locked position is verified.

* * * * *